United States Patent
Zhang

(10) Patent No.: US 7,465,251 B2
(45) Date of Patent: Dec. 16, 2008

(54) HYBRID ELECTRIC VEHICLE

(76) Inventor: Lingling Zhang, 3012 Gallinger Dr., Ann Arbor, MI (US) 48103

( * ) Notice: Subject to any disclaimer, the term of this patent is extended or adjusted under 35 U.S.C. 154(b) by 175 days.

(21) Appl. No.: 11/178,725

(22) Filed: Jul. 11, 2005

(65) Prior Publication Data

US 2006/0009323 A1 Jan. 12, 2006

Related U.S. Application Data

(60) Provisional application No. 60/587,073, filed on Jul. 10, 2004.

(51) Int. Cl.
*B60W 10/02* (2006.01)
*F16H 3/72* (2006.01)
(52) U.S. Cl. .............................. 477/5; 475/5
(58) Field of Classification Search ............... 475/5; 477/4, 5; 180/65.2, 65.3, 65.4
See application file for complete search history.

(56) References Cited

U.S. PATENT DOCUMENTS

| | | | |
|---|---|---|---|
| 5,643,119 A | 7/1997 | Yamaguchi et al. | |
| 5,904,631 A | 5/1999 | Morisawa et al. | |
| 5,934,395 A | 8/1999 | Koide et al. | |
| 6,371,878 B1 * | 4/2002 | Bowen | 475/5 |
| 6,383,106 B1 * | 5/2002 | Kashiwase | 475/5 |
| 6,387,004 B1 * | 5/2002 | Parrish | 475/5 |
| 6,455,947 B1 | 9/2002 | Lilley et al. | |
| 6,656,082 B1 * | 12/2003 | Yamada et al. | 477/5 |
| 7,001,296 B2 * | 2/2006 | Yamauchi et al. | 475/5 |
| 7,175,555 B2 * | 2/2007 | Kozarekar et al. | 475/5 |
| 7,239,003 B2 * | 7/2007 | Mouli et al. | 257/510 |
| 2002/0065165 A1 * | 5/2002 | Lasson et al. | 477/3 |

\* cited by examiner

*Primary Examiner*—Roger Pang

(57) ABSTRACT

A hybrid electric drive system for a motor vehicle includes a heat engine, a first motor, a second motor, and a planetary gear unit. The planetary gear unit includes at least a sun gear (an input element), a ring gear (an input element) and a pinion carrier (an output element). The engine is connected to and applies torque on one of the input elements. The first motor is connected to the engine shaft and is to start the engine while the vehicle is either moving or standing still, and to generate electrical power when the engine is running. The second motor is connected to and applies torque on the other input element The carrier of the planetary gear unit is connected a drive shaft to drive the wheels.

1 Claim, 5 Drawing Sheets

HYBRID ELECTRIC VEHICLE

CROSS-REFERENCE TO RELATED APPLICATION

This application claims the benefit of PPA Ser. No. 60/587,073, filed 2004 Jul. 10 by the present inventor.

FEDERALLY SPONSORED RESEARCH

Not Applicable

SEQUENCE LIST OR PROGRAM

Not Applicable

TECHNICAL FIELD

This invention relates to hybrid electric vehicle. More particularly, this invention relates to a hybrid electric vehicle with a planetary gear unit.

BACKGROUND OF THE INVENTION

In a conventional vehicle, an internal combustion engine generates rotary power by burning fuel, and the power is transmitted to the driving wheels through a mechanical transmission. The engine is the only power supply of the vehicle and has to provide all the torque that the vehicle needs. When cruising on a flat road, the vehicle only needs relatively small power or torque to maintain its speed, but it takes much more power or torque to accelerate or go uphill. The engine has to able to deliver the peak torque required for acceleration and uphill, so a very powerful engine usually is required. Although the peak power is needed only a small fraction of working time, the engine has to overcome friction and keep running. The bigger the engine, the stronger the friction, and the more energy is required to maintain the engine running.

When the brake is applied, the kinetic energy of the vehicle is converted into heat, losing a large amount of energy. Also the conventional vehicle keeps burning fuel when it stops at traffic light.

In order to improve fuel efficiency and reduce emission, many hybrid electric vehicles are proposed: one or more electrical motors are used to assist the engine when high torque is needed; the motor(s) also can re-generate electric power while applying brake torque on the wheels; a power battery stores electric energy when it is available and provides the energy to the motor(s) when it is needed.

A so called "full hybrid vehicle" has the abilities of: shutting down engine when the vehicle stops, running solely on electrical power at low and medium speed, starting engine when the vehicle reaches a certain speed, regenerating electricity while braking; and assisting the engine with electric power when needed.

A hybrid electric drive system is proposed in U.S. Pat. No. 5,934,395. It is a full hybrid vehicle. The vehicle has an engine, two electric motors, an inverter for each motor, a battery, and a distributing mechanism.

The distributing mechanism splits the engine power/torque between one of the motors and the drive shaft. A certain fraction of the engine power/torque goes to the motor, and the rest goes to drive shaft. In other words, not all the engine torque can go to the drive shaft directly, even though the engine torque is crucially needed. This causes a slow performance or claims a high capacity of motor drives.

The purpose of this invention is to provide a full hybrid electric drive system which can fully use of the engine torque to drive the vehicle.

SUMMARY OF THE INVENTION

A hybrid electric vehicle according to the present invention has an internal combustion engine, a first motor, a second motor, and a planetary gear unit.

The planetary gear unit has a star gear, a carrier with planet gears (pinions), and a ring gear. The carrier is the output element and is connected to the drive shaft, and the star gear and the ring gear are the input elements, one connected to the engine and the other connected to the second motor.

The first motor is connected to the engine shaft and is to start the engine and generate electricity using engine's power. The engine and the first motor drive the sun gear, the second motor drives the ring gear, and the carrier outputs a torque to the drive shaft. Instead of splitting the torque of the engine, the planetary gear combines the torques of the engine and the second motor to drive the vehicle. In another ward, the output torque of the planetary gear unit is the sum of the engine torque and the second motor torque.

The second motor creates torque to drive the vehicle. It also applies braking torque on the drive shaft during braking, and at the same time, it recovers the kinetic energy of the vehicle into electric energy for a battery to store.

As an option, a one-way-clutch/brake may be installed on the engine shaft to keep the engine from moving as needed.

As an option, a clutch may be installed between any two elements of the planetary gear unit. The clutch can lock the three elements together, so the engine can drive the wheels directly.

As an option, a reverse mechanism is installed any place between the engine shaft and the drive shaft.

DETAILED DESCRIPTION OF THE PREFERRED EMBODIMENTS

For the sake of convenience of description, if an engine shaft is connected to a mechanical component, it is simply said as that the engine is connected to the component; if a motor rotor shaft is connected to a mechanical component, it is simply said as that the motor is connected to the component; when an engine or a motor is said being connected to another component, it may mean either a direct connection or a connection through some mechanical means like a set of gears.

Figure 1:
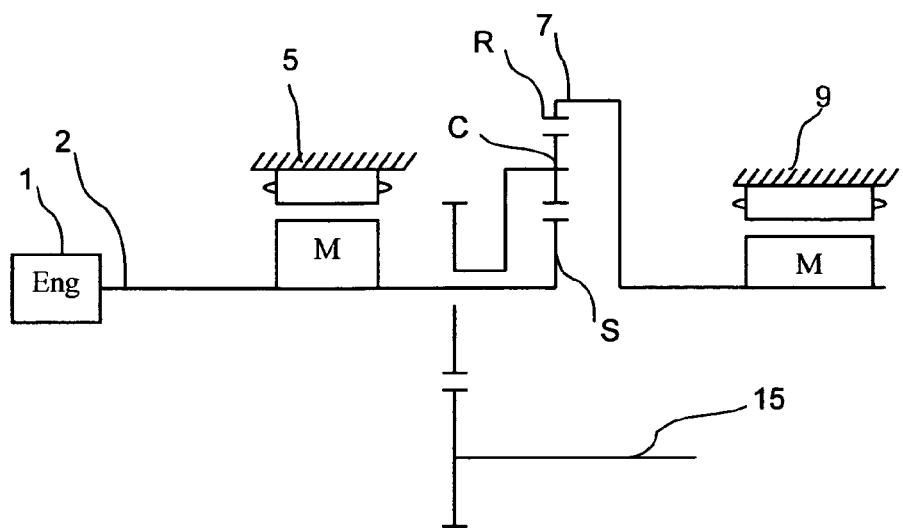
FIG. 1 shows the schematic view of a hybrid all-wheel drive system according to a first embodiment of the present invention.

FIG. 1 shows the schematic view of a hybrid electric drive system according to a first embodiment of the present invention. The hybrid drive system includes: a heat engine 1 with an output shaft 2; a planetary gear unit 7, a first motor 5; a second motor 9; and a drive shaft 15.

The planetary gear unit 7 includes at least three elements: a sun gear S, a ring gear R, and a planet pinion carrier C. The sun gear S is an input element and connected to the engine shaft 2. The ring gear R is another input element and connected to the second motor 9. The carrier C is the output element and is connected to the drive shaft 15 which drives the wheels (not shown).

The engine 1 converts the fuel energy into mechanical energy and, through its shaft 2, applies a torque on the sun gear S.

The first motor 5 is connected to the engine shaft 2 and is to start the engine 1 and generate electricity by using the engine's power.

The second motor 9 applies a torque on the ring gear R to drive the vehicle. It also applies braking torque on the drive shaft 15 during braking and, at the same time, recovers the kinetic energy of the vehicle into electric energy for a battery (not shown) to store.

The engine 1 drives the sun gear S, the second motor 9 drives the ring gear R, and the carrier C outputs a torque to the drive shaft 15. Instead of splitting the torque of the engine 1, the planetary gear unit 7 combines the torques of the engine 1 and the second motor 9 to drive the vehicle. In another ward, the output torque of the planetary gear unit 7 is the sum of the engine 1 torque and the second motor 9 torque.

Figure 2:
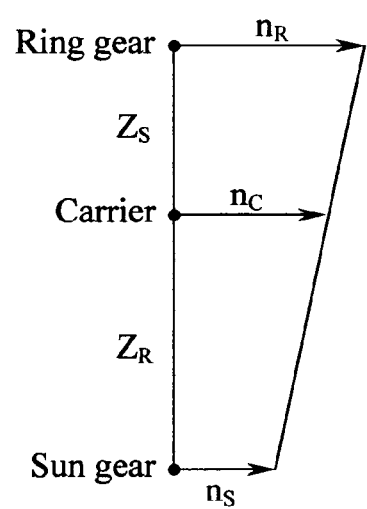
FIG. 2 is a velocity line diagram depicting the interrelationship among the sun gear speed ($n_S$), the ring gear speed ($n_R$), and the carrier speed ($n_C$) according to the present invention.

FIG. 2 shows the relationship among the sun gear speed ($n_S$), the ring gear speed ($n_R$), and the carrier speed ($n_C$), wherein $Z_S$ and $Z_R$ are the numbers of cogs of the sun gear S and the ring gear R, respectively. The arrows point out the forward rotary direction of the three elements, respectively. When any two of the speeds are known, the third speed is determined and can be calculated by using the following equation:

$$n_S \cdot Z_S + n_R \cdot Z_R = n_C \cdot (Z_S + Z_R) \quad (1)$$

Figure 3:
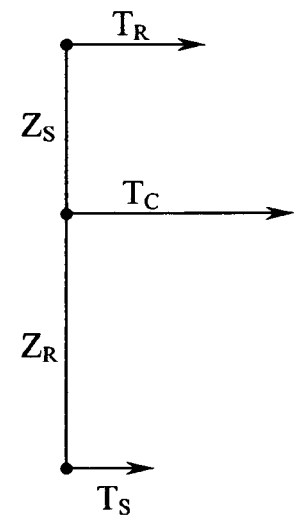
FIG. 3 is a torque line diagram depicting the interrelationship among the sun gear torque ($T_S$), the ring gear torque ($T_R$), and the carrier torque ($T_C$) according to the present invention.

FIG. 3 shows the torque on the sun gear S ($T_S$), the torque on the ring gear R ($T_R$), and the torque on the carrier C ($T_C$), wherein $Z_S$ and $Z_R$ are the numbers of cogs of the sun gear S and the ring gear R, respectively. The arrows point out the forward torque direction of the three elements, respectively. When any one of the torques is known, the other two are determined and can be calculated:

$$T_C = T_S + T_R \quad (2)$$

$$\frac{T_S}{Z_S} = \frac{T_R}{Z_R}$$

Operation

This is a full hybrid-electric drive system, and it has the abilities of: shutting down engine when the vehicle stops, running solely on electrical power at low and medium speed, starting engine when the vehicle reaches a certain speed, regenerating electricity while braking; and assisting the engine with electric power when it is needed.

Figure 4:
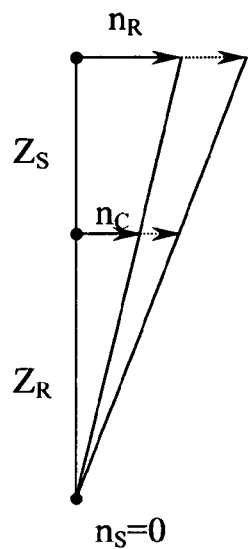
FIG. 4 is a velocity line diagram depicting the sun gear speed ($n_S$), the ring gear speed ($n_R$), and the carrier speed ($n_C$) when the vehicle is driven only by electric motor according to according to the present invention.

To Drive the Vehicle Only by the Electric Motors:

In this mode, the engine 1 is down, and the second motor 9 run forwards, applying a torque on the ring gear R. The ring gear R applies forces on the planet pinions, and the pinions tend to turn the sun gear R backwards. To keep the engine 1 from turning backwards, the first motor 5 applies a forward torque on the sun gear S and holds the engine shaft 2. The pinions turn the carrier C forwards, and the carrier C turns the drive shaft 15 forwards. FIG. 4 shows the speeds of the sun gear S, the ring gear R, and the carrier C. In this situation, the engine 1 does not work, so ns is zero.

Figure 5:
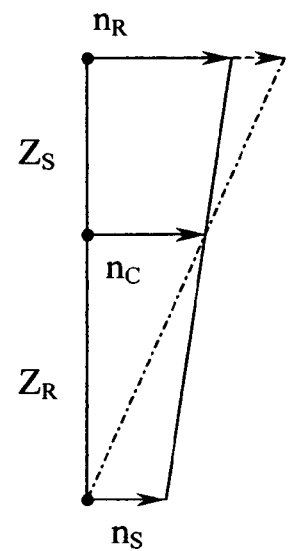
FIG. 5 is a velocity line diagram depicting the procedure of starting the engine 1 while the vehicle is running according to according to the present invention.

To Start the Engine While the Vehicle is Running:

In order to start the engine 1 while the vehicle is moving, the first motor 5 turns the engine shaft 2 forwards; when the engine 1 reaches its idle speed, it starts. FIG. 5 shows the procedure of starting the engine 1 while the vehicle is moving. The dotted lines represent the speeds before the engine 1 is started: the engine 1 is not running ($n_S$=0), and the ring gear R and the carrier C runs at $n_R$ and $n_C$, respectively. It takes relatively short time to start the engine 1, so the vehicle speed is assumed unchanged during that time. Since the carrier C is connected to one pair of the wheels, its speed ($n_C$) is considered unchanged. In order to start the engine 1, the sun gear S speed goes up to the speed $n_S$, and the ring gear R is slowed down as shown by the solid arrow.

Figure 6:
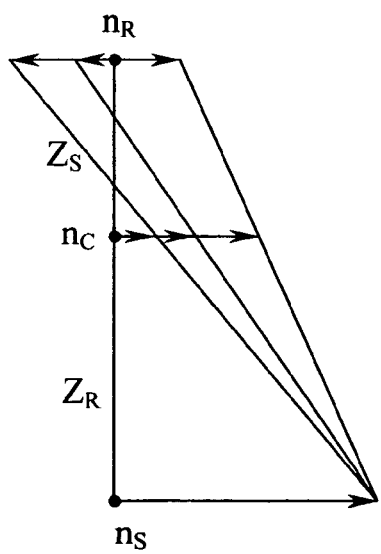
FIG. 6 is a velocity line diagram depicting the speeds of the sun gear S, the Ring gear R, and the carrier C during the acceleration of the vehicle while the engine is running.
Figure 7:
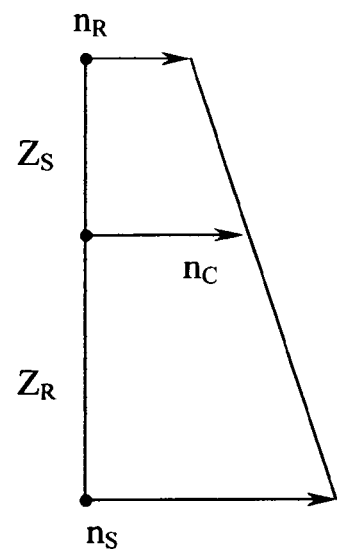
FIG. 7 is a velocity line diagram depicting the speeds of the sun gear S, the Ring gear R, and the carrier C during the vehicle is cruising according to the first embodiment of the present invention.

Engine and Electric Motors Drive Together:

According to Equation 1 and FIG. 5~7, if the speed of the ring gear ($n_R$) is changed, the speed ratio of the sun gear ($n_S$) to the carry ($n_C$) will be changed. The engine shaft 2 is connected to the sun gear S and the carrier C is connected to the drive shaft 15 which drives the wheels. Since the second motor 9 is fixed to the rug gear R, the speed ratio of the engine to the wheels can be changed by changing the speed of the second motor 9. A separate and dedicated mechanical transmission is not needed for changing speed ratio.

Being started, the engine 1 begins to drive the sun gear S forward. FIG. 6 shows the speeds of the sun gear S, the Ring gear R, and the carrier C. The carrier C runs at a forward speed $n_C$, and the sun gear S runs at a forward speed $n_S$. The ring gear R may run backwards at a speed $n_R$ at first when the vehicle speed is low. While the vehicle runs faster and faster, the value of the backward speed becomes smaller and smaller, toward to zero, and then the ring gear R runs at a forward speed $n_R$ as shown in FIG. 6 and FIG. 7.

The engine 1 and the second motor 9 keep driving the sun gear S and the ring gear R, respectively, and the carrier C drives the wheels for acceleration. When the vehicle reaches the cruise speed, the required torque becomes smaller, so neither the engine 1 nor the second motor 9 works at full power. During cruise, the first motor 5 generates electric power by using the engine 1 torque, and the electric power is used to drive the second motor 9 to apply a forward torque on the ring gear R.

Figure 8:
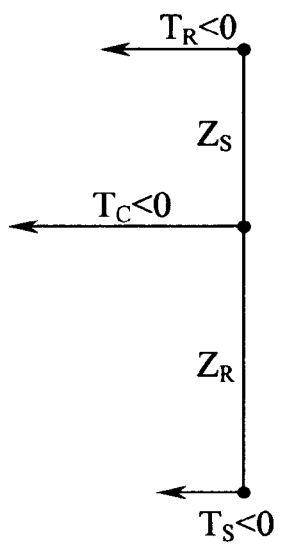
FIG. 8 is a torque line diagram depicting the interrelationship among the sun gear torque ($T_S$), the ring gear torque ($T_R$), and the carrier torque ($T_C$) when the vehicle brakes according to the first embodiment of the present invention.

To Apply Braking Torque on the Drive Shaft:

When brake is applied, the engine 1 is running idle or turned off, the motor 5 applies a backward torque on the sun gear S, and the motor 9 applies a backward torque on the ring gear R. As shown in FIG. 8, the carrier C outputs a backward torque which tends to slow down the wheels. When the motors apply braking torque, they can convert the vehicle's kinetic energy into electric energy for the battery to store.

To Start the Engine While the Vehicle Stops:

The first motor 5 can start the engine 1 while the vehicle stops. To do so, the first motor 5 turns the engine shaft 2 and the sun gear S forward; when reaching its idle speed, the engine 1 starts. The carrier C has the speed of zero because the wheel speed is zero. The sun gear S drives the pinions, and the pinions drive ring gear R to run backward at a speed $n_R$. Connected to the ring gear R, the motor 9 runs idle backwards. See FIG. 9

Figure 9:
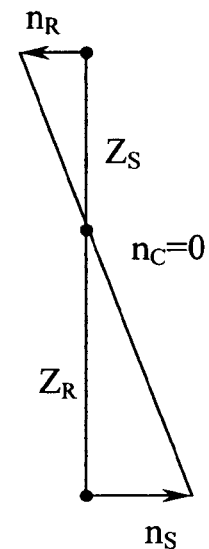
FIG. 9 is a velocity line diagram depicting the speeds of the sun gear S, the Ring gear R, and the carrier C when the motor 5 generates electricity while the vehicle stops and when the motor 5 starts the engine 1 while the vehicle stops.

To Generate Electricity While the Vehicle Stops:

After being started, the engine 1 drives the first motor 5 to generate electricity while the vehicle stands still. FIG. 9 also shows the speeds of the three elements of the planetary gear unit 7 in this situation. The speed $n_C$ of the carrier C is zero because the wheels are not moving. The engine 1 runs at a forward speed $n_S$, driving the ring gear R to run at a backward speed $n_R$. The first motor 5 generates electricity using the energy from the engine shaft 2, and the second motor 9 runs idle backwards.

Figure 10:
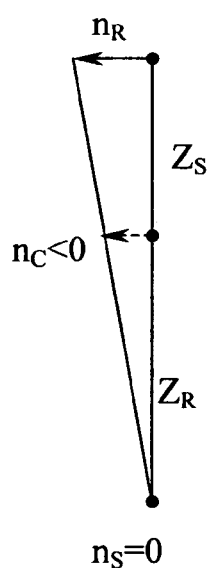
FIG. 10 is a velocity line diagram depicting how the motor 5 drive the vehicle reverse while the engine 1 is off according to the first embodiment of the present invention.

To Drive the Vehicle Reverse:

The system is able to drive the vehicle reverse when the engine 1 is down. To do so, the first motor 5 applies a backward torque to hold the sun gear S, and the second motor 9 applies a backward torque to the ring gear R. As a result, the carrier C outputs a backward torque to the drive shaft 15, and the drive shaft 15 drives the vehicle reverse. See FIG. 10.

Figure 11:
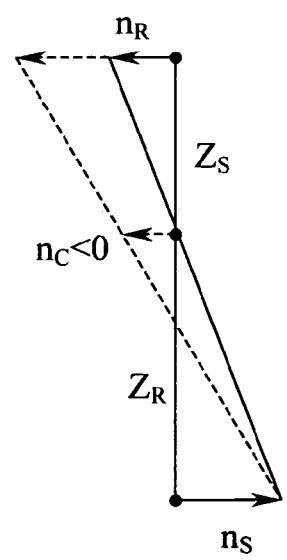
FIG. 11 is a velocity line diagram depicting how the motor 5 drive the vehicle reverse while the engine 1 is on according to the first embodiment of the present invention.

The system is also able to drive the vehicle reverse when the engine 1 is running. To do so, the first motor 5 applies a backward torque on the sun gear S, even though it runs forwards; the second motor 9 applies a backward torque on the ring gear R; although the engine 1 is running, it does not apply any torque on the sun gear S. As a result, the carrier C outputs a backward torque to the drive shaft 15, and the drive shaft 15 drives the vehicle reverse. See FIG. 11.

It should be understood that the sun gear S may exchange its connection with the ring gear R and the system will work in the similar ways. In this situation, the engine 1 and the first motor 5 are connected to the ring gear R, and the second motor 9 is connected to the sun gear S.

Figure 12:
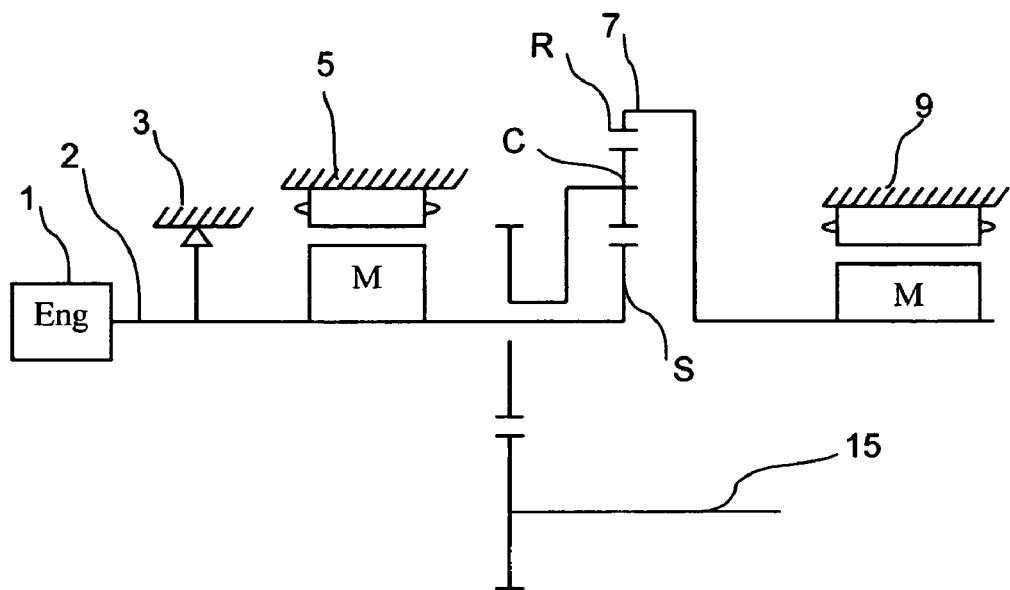
FIG. 12 shows the schematic view of a hybrid all-wheel drive system according to a second embodiment of the present invention.

For those who have expertise in the field, it is obvious that a couple of parts could be added to the system to improve fuel efficiency and/or simplify the control strategy. For example, as shown in FIG. 12, a one-way-clutch or a brake 3 may be added on the engine shaft 2. The clutch/brake 3 is to take over the first motor's function of keeping the engine 1 from moving during pure electric driving. The speeds of the three elements are the same as those in FIG. 4.

Figure 13:
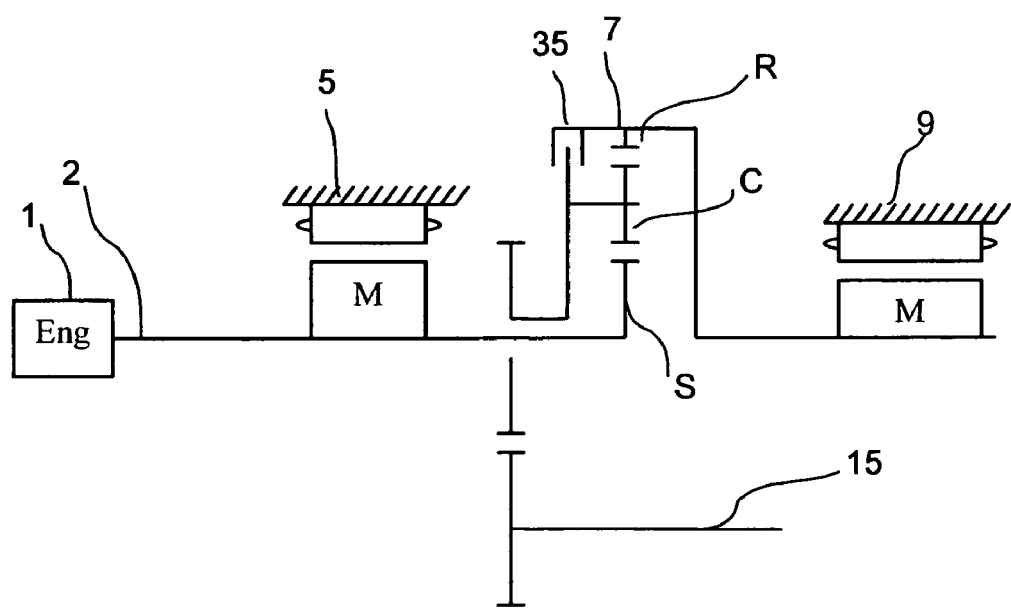
FIG. 13 shows the schematic view of a hybrid all-wheel drive system according to a third embodiment of the present invention.
Figure 14:
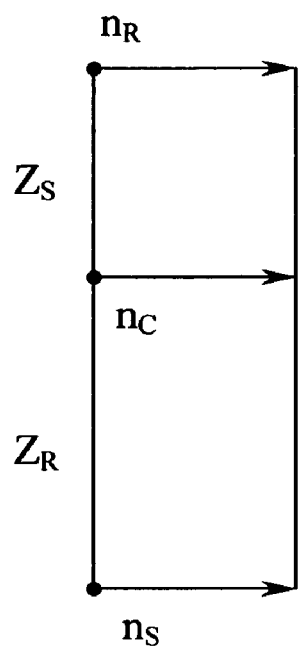
FIG. 14 is a velocity line diagram depicting the speeds of the sun gear S, the Ring gear R, and the carrier C when the clutch between the carrier C and the ring gear R is engaged in the third embodiment according to the present invention.

Also, as shown in FIG. 13, a clutch 35 may be added between the ring gear R and the carrier C. When the clutch 35 is engaged, the three elements of the planetary gear unit will be lacked together, running at the same speed as shown. in FIG. 14, and so the engine 1 can directly and solely drive the vehicle, improving the fuel efficiency In Fact, the clutch 35 could be installed between any two elements of the planetary gear unit. Also the one-way-clutch/brake 3 in FIG. 12 can be combined with the clutch 35 in FIG. 14.

It should be understood that there is no intention to limit the invention to the specific forms disclosed, but on the contrary, the invention is to cover all variations, modifications and improvements that come with the true spirit and scope of the invention as expressed in the appended claims.

What is claimed is:

1. A hybrid electric vehicle comprising:

a heat engine outputting power through a engine shaft;

a first electric motor, with rotor being fixed to said engine shaft, for outputting torque and for generating electric power;

a second electric motor for providing drive and brake torque;

a planetary gear unit, for mechanically combining the torque of said engine with the torque of said second motor to drive the vehicle, comprising at least three gear elements which are a first gear element connected to said engine shaft, a second gear element being fixed to a rotor of said second motor, and a third gear element for outputting the torque to drive the vehicle;

a case, being stationary to the vehicle, for housing said first motor, said second motor, and said planetary gear unit; and a one-way-clutch, being fixed between said engine shaft and said case, for keeping said engine shaft from rotating backwards;

wherein the speed ratio of said engine to the wheels of the vehicle can be changed by changing the speed of said second motor, so said planetary gear unit and the two motors make a transmission of the vehicle.

* * * * *